United States Patent [19]

Son

[11] 3,895,060

[45] July 15, 1975

[54] CYCLOALKYLTHIO (NITRO SUBSTITUTED) ANILINE COMPOUNDS

[75] Inventor: Pyong-Nae Son, Akron, Ohio

[73] Assignee: The B. F. Goodrich Company, Akron, Ohio

[22] Filed: June 6, 1973

[21] Appl. No.: 367,643

[52] U.S. Cl.......... 260/551 S; 260/79.5 B; 260/780; 260/798
[51] Int. Cl........................................ C07c 145/00
[58] Field of Search............ 260/551 S, 780, 79.5 B

[56] References Cited
UNITED STATES PATENTS 3,513,139  5/1970  Coran et al....................... 260/79.5
3,705,135  12/1972  Wolfinger.......................... 260/79.5

OTHER PUBLICATIONS

Kornet et al., "J. Pharm. Sci.," Vol. 60(5), pp. 803-805, (1971).

Primary Examiner—Lewis Gotts
Assistant Examiner—S. P. Williams
Attorney, Agent, or Firm—J. Hughes Powell, Jr.

[57] ABSTRACT

Cycloalkylthioanilines having at least two electron-withdrawing groups on a phenyl ring are efficient vulcanization retarders. The compounds are prepared by the reaction of an aniline compound having at least two electron-withdrawing groups on a phenyl ring with a cycloalkanesulfenyl chloride.

4 Claims, No Drawings

CYCLOALKYLTHIO (NITRO SUBSTITUTED) ANILINE COMPOUNDS

BACKGROUND OF THE INVENTION

Unsaturated polymers are admixed with compounding and cure ingredients, processed and formed into shapes, and cured to yield finished products. If cure starts during processing and forming operations, the polymer mixture (stock) gets tough and hard to work, and often is discarded. This toughening phenomenon, known as scorching, is caused by premature activation of the vulcanization accelerator(s). Vulcanization retarders are used to delay the action of the accelerators. However, many of the older known types of retarders such as salicylic acid, benzoic acid, and N-nitrosodiphenylamine are only marginally effective when used with the so-called fast-acting accelerators such as 2-mercaptobenzothiazole and the like. The problem of scorching is even more serious when amine-based antioxidants and antiozonants or high pH carbon blacks, all of which make stocks more scorchy, are employed. New compounds are needed to impart safety to scorchy stocks. Compounds as vulcanization retarders are disclosed in U.S. Pat. Nos. 3,513,139; 3,539,538; 3,546,185; 3,562,225; 3,586,696; 3,637,844; and 3,640,976.

SUMMARY OF THE INVENTION

Cycloalkylthioaniline compounds of the formula

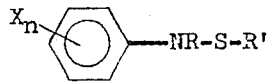

wherein X is an electron-withdrawing group and n is 2 to 4; R is hydrogen, an alkyl radical containing 1 to about 8 carbon atoms, an aryl group containing 6 to about 14 carbon atoms which can contain electron-withdrawing groups, or —SR'; and R' is a cycloalkyl radical containing 4 to 8 carbon atoms in the ring, are highly effective vulcanization retarders for sulfur-vulcanizable polymers containing sulfur and accelerator compounds.

DETAILED DESCRIPTION

The cycloalkylthioaniline compounds have the formula

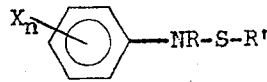

wherein X is an electron-withdrawing group and $n$ is 2 to 4; R is hydrogen, an alkyl radical containing 1 to about 8 carbon atoms, an aryl group containing 6 to about 14 carbon atoms which can contain electron-withdrawing groups, or —SR'; and R' is a cycloalkyl radical containing 4 to 8 carbon atoms in the ring. The cycloalkyl radical can be further substituted with 1 to 4 carbon atom alkyl radicals. Examples of electron-withdrawing groups are —Cl, —Br, —I, —F, —SO$_2$R$_a$, —NO$_2$, and —COOR$_a$ where R$_a$ is an alkyl radical containing 1 to 18 carbon atoms.

Examples of the cycloalkylthioaniline compounds are: N-cyclobutylthio-2,4-dichloroaniline, N-cyclobutylthio-2,4-dibromoaniline, N-cyclobutylthio-2,4-dichloro-6-nitroaniline, N-cyclobutylthio-2,4-di(ethylcarbooxy)aniline, N-cyclobutylthio-2,4-dinitroaniline, N-cyclobutylthio-2-bromo-4-nitroaniline, N-cyclobutylthio-N-methyl-2,4-dinitroaniline, N,N-di(cyclobutylthio)-3,5-dinitroaniline, N-cyclopentylthio-N-phenyl-2,4-dibromoaniline, N-cyclopentylthio-2,4-dichloroaniline, N-cyclopentylthio-2,6-dichloro-4-nitroaniline, N-cyclopentylthio-N-ethyl-2,4-dichloroaniline, N-cyclopentylthio-2,6-dinitroaniline, N-cyclopentylthio-2-bromo-4,6-dinitroaniline, N-cyclopentylthio-2,4-di(methylsulfonyl)aniline, N-cyclopentylthio-2,4,5-trichloroaniline, N-cyclohexylthio2,4-dibutylcarbooxyaniline, N-cyclohexylthio-2,4-dichloroaniline, N-cyclohexylthio-2-chloro-5-nitroaniline, N-cyclohexylthio-N-propyl-2,6-dichloroaniline, N-cyclohexylthio-N-(2,4-dinitrophenyl)-2,4-dinitroaniline, N-cyclohexylthio-2,4-difluoroaniline, N-cyclohexylthio-2,4-di(ethylsulfonyl)aniline, N-cyclohexylthio-2,4-dinitroaniline, N-cyclohexylthio-3-iodo-5-nitroaniline, N-cyclohexylthio-N-methyl-2,4-dinitroaniline, N-cyclohexylthio-2,6-diiodo-4-nitroaniline, N-cyclohexylthio-N-phenyl-3,4-dichloroaniline, N-(4-methylcyclohexylthio)-2,4-dinitroaniline, N-(3,5-diethylcyclohexylthio)-3,4-dichloroaniline, N-cyclohexylthio-2,4,6-tribromoaniline, N,N-di(cyclohexylthio)-2,4-dinitroaniline, N-cycloheptylthio-2,5-dibromoaniline, N-cycloheptylthio-2,3,5,6-tetrafluoroaniline, N-cycloheptylthio-N-tolyl-2,4-di(ethylsulfonyl)aniline, N-cycloheptylthio-4-fluoro-3-nitroaniline, N-cycloheptylthio-2,4-dinitroaniline, N-cycloheptylthio-N-ethyl-2,4-dinitroaniline, N-cycloheptylthio-2,3,4,5-tetrachloroaniline, N-cycloheptylthio-3,5-dichloroaniline, N-cycloheptylthio-2,5-dichloroaniline, N-cycloheptylthio-2-chloro-5-nitroaniline, N-cyclooctylthio-2,4-dinitroaniline, N-cyclooctylthio-2,4-dichloroaniline, N-cyclooctylthio-2-fluoro-5-nitroaniline.

More preferred, the cycloalkylthioaniline compound has the formula

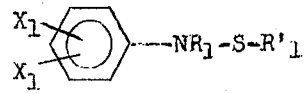

wherein X$_1$ is selected from the group consisting of —Cl, —NO$_2$, and —COOR'$_a$ where R'$_a$ is an alkyl radical containing 1 to 8 carbon atoms; R$_1$ is hydrogen, a phenyl radical containing two X$_1$ groups, or —SR'$_1$; and R'$_1$ is a cycloalkyl radical containing 5 to 7 carbon atoms in the ring. X$_1$ is usually located at the 2,3; 2,4; 2,5; 2,6; 3,4; or 3,5 positions on the phenyl ring.

Examples of the more preferred compounds are: N-cyclopentylthio-2,3-dichloroaniline, N-cyclopentylthio-2,4-dichloroaniline, N-cyclopentylthio-2,6-dichloroaniline, N-cyclopentylthio-2,4-dinitroaniline, N-cyclopentylthio-N-(3,4-dichlorophenyl)-3,4-dichloroaniline, N-cyclopentylthio-2-chloro-5-nitroaniline, N,N-di(cyclopentylthio)-2,4-dinitroaniline, N-cyclohexylthio-3,4-dichloxoaniline, N-cyclohexyl-2,6- dinitroaniline, N-cyclohexylthio-2,4-di(ethylcarbooxy)aniline, N-cyclohexylthio-N-(2,4-dichlorophenyl)-2,4-dichloroaniline, N-cyclohexylthio-3,5-dinitroaniline, N-cyclohexylthio- 2,4-dinitroaniline, N-cyclohexylthio-4-chloro-2-nitroaniline, N-cyclohexylthio-2,4-dinitroaniline, N,N-di(cyclohexylthio)-2,4-dinitroaniline, N-cycloheptylthio-2,4-dichloroaniline, N-cycloheptylthio-2-chloro-5-nitroaniline, N-cycloheptylthio-3,4-dichloroaniline, N-cycloheptylthio-N-(2,4-dinitrophenyl)-2,4-dinitroaniline, N-cycloheptylthio-2,4-dinitroaniline, and the like.

Even more preferred, the compounds contain dinitro- or dichloroaniline groups; i.e., where $X_1$ is $—NO_2$ or $—Cl$, $R_1$ is hydrogen and $R_1'$ is a cycloalkyl radical containing 5 to 7 carbon atoms in the ring. Examples of the compound are: N-cyclopentylthio-2,4-dichloroaniline, N-cyclopentylthio-2,6-dichloroaniline, N-cyclopentylthio-2,4-dinitroaniline, N-cyclohexylthio-3,4-dichloroaniline, N-cyclohexylthio-2,6-dinitroaniline, N-cyclohexylthio-3,5-dinitroaniline, N-cyclohexylthio-2,4-dinitroaniline, N-cycloheptylthio-2,4-dichloroaniline, N-cycloheptylthio-2,3-dichloroaniline, N-cycloheptylthio-2,4-dinitroaniline, and the like.

The compounds are prepared by the reaction of a cycloalkanesulfenyl chloride with aniline compounds. The reaction follows that employed by Behrorouz et al. Journal of Organic Chemistry, Vol. 34, Page 51 (1969). The cycloalkanesulfenyl chloride is prepared by reacting a cycloalkylthiol of the formula H—S—R', where R' is defined as above, with chlorine gas. This reaction is usually conducted in a solvent such as hexane, carbon tetrachloride, ethylidene trichloride, and the like, at a temperature from about —20°C. to about 30°C.

The cycloalkanesulfenyl chloride is reacted with an aniline of the formula

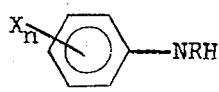

wherein $X_n$ and R are defined as above. The reaction temperature ranges from about —10°C. to about 60°C. Solvents for the reaction are hexane, heptane, carbon tetrachloride, ethylidene trichloride, benzene, chlorobenzene, tetrahydrofuran, dioxane, dimethylformamide, and the like. A mixture of two solvents can be employed. A particularly useful combination is to employ a mixture of tetrahydrofuran or dimethylformamide along with an alkyl or halogenated alkyl hydrocarbon.

The reaction can be catalyzed by tertiary amines such as triethylamine and the like, or by an organic lithium compound such as n-butyl lithium. Reaction time is from about 1 to 4 hours.

The cycloalkanesulfenyl chloride and the aniline compound are used in the reaction at about 1 to 4 moles of cycloalkanesulfenyl chloride per mole of aniline compound. It is not necessary to use over 4 moles of the chloride to achieve the instant compounds. If in the aniline compound R is hydrogen, the cycloalkanesulfenyl chloride can react with both hydrogens of the aniline compound to prepare a di(cycloalkylthio)aniline compound.

The cycloalkylthioaniline compound can be isolated from the reaction solution by drying down or coagulation using water followed by filtration and drying. The compound can be purified by washing with water and/or recrystallization from hexane. The cycloalkylthioanilines can be characterized by their Infra-red (IR) and nuclear magnetic resonance (NMR) spectra, and/or by carbon, hydrogen, nitrogen, and sulfur analysis.

The cycloalkylthioaniline compounds are used in a range from about 0.05 part to about 5 parts by weight per 100 parts by weight of polymer. More preferredly, they are used in from about 0.1 part to about 3 parts by weight. The compounds are effective retarders, often delaying the onset of cure 100% or more when used at a level of from about 1 part by weight. They are useful with a broad range of sulfur- and nitrogen-based accelerator compounds. Examples of these accelerators are the metal salts of dialkyl and diaryldithiocarbamates such as zinc and lead dimethyldithiocarbamate, zinc, bismuth, cadmium, selenium, and tellurium diethyldithiocarbamate, sodium dibutyldithiocarbamate, zinc dibenzyldithiocarbamate, and the like, and bis-(dimethylthiocarbamyl)sulfide, N-pentamethyleneammonium N-pentamethylenedithiocarbamate, and the like; benzothiazoles and benzothiazole-sulfenamides such as 2-mercaptobenzothiazole and the zinc salt thereof, 2-(2,6-dimethyl-4-morpholinothio)benzothiazole, 2-benzothiazole-4-morpholinyl disulfide, 2,2'-benzothiazyl disulfide, N-diisopropyl-2-mercaptobenzothiazole sulfenamide, N-t-butyl-2-benzothiazole sulfenamide, N-cyclohexyl-2-benzothiazole sulfenamide, N-oxydiethylene-2-benzothiazole sulfenamide, and the like; thiuram sulfides such as tetramethylthiuram mono- and disulfide, tetraethylthiuram disulfide, tetrabutylthiuram monosulfide, and the like; thioureas such as ethylenethiourea, trimethylthiourea, N,N'-diethylthiourea, N,N'-dibutylthiourea, N,N'-diphenylthiourea, and the like; morpholines such as 4,4'-dithiomorpholine; polyamines such as triethylene diamine, hexamethylene tetraamine, tricretonylidene tetraamine, and the like; amine and aldehyde condensation products such as acetaldehyde-ammonia, butyraldehyde-butylamine, butyraldehyde-aniline, heptaldehydeaniline, ethylchloride-formaldehyde-ammonia, and the like; imidazolines such as 2-mercaptoimidazoline; and guanidines such as diphenylguanidine, di-ortho-tolylguanidine, and the like.

The accelerators may be used alone or in combination with each other. They are used in levels from about 0.05 to about 7 parts by weight total, and more preferably from about 0.2 part to about 5 parts by weight per 100 parts by weight of polymer. Elemental sulfur or sulfur donors such as dipentamethylenethiuram hexasulfide are employed with the vulcanization accelerators in levels from about 0.1 to about 10 parts by weight.

The cycloalkylthioaniline vulcanization retarders are used to delay the cure of sulfur vulcanizable polymers. These polymers have an olefinic ($>C=C<$) content of from about 0.1% to about 45% by weight based upon the total weight of the polymer. The olefinic unsaturation can be in the polymer backbone or can be present as side-chain unsaturation. These polymers are usually highly unsaturated rubbers containing at least 50% and up to 100% by weight of a conjugated diene monomer containing 4 to about 8 carbon atoms, and up to about 50% by weight of copolymerizable vinylidene monomers having a terminal vinylidene ($CH_2=C<$) group. Examples of the conjugated diene monomers are butadiene, isoprene, chloroprene, 2-isopropyl-1,3-butadiene, 1,3-pentadiene, and the like. More preferred are the conjugated dienes containing 4 to about 6 carbon atoms such as butadiene, chloroprene, and isoprene.

Examples of copolymerizable vinylidene monomers containing a terminal vinylidene group are (a) monoolefins containing 2 to about 8 carbon atoms; (b) vinyl aromatics such as styrene, α-methyl styrene, vinyl toluene, chlorostyrene, and the like; (c) vinyl nitriles such as acrylonitrile, methacrylonitrile, and the like; (d) vinyl and allyl esters such as vinyl acetate, vinyl propionate, allyl acetate, and the like; (e) vinyl and allyl ethers such as vinyl methyl ether, allyl methyl ether, and the like; (f) divinyls and diacrylates such as divinylbenzene, divinyl ether, diethylene glycol diacrylate, and the like; and (g) acrylates of the formula

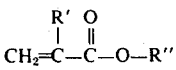

wherein R' is —H, —CH$_3$ or —C$_2$H$_5$, and R'' is an alkyl radical containing 1 to 18 carbon atoms or an alkoxyalkyl, an alkylthioalkyl, or cyanoalkyl radical containing 2 to about 12 carbon atoms. Examples of such acrylates are ethyl acrylate, butyl acrylate, octadecyl acrylate, methoxyethyl acrylate, butoxyethyl acrylate, hexylthioethyl acrylate, β-cyanoethyl acrylate, cyanooctyl acrylate, methyl methacrylate, octyl methacrylate, ethyl ethacrylate, and the like.

The highly unsaturated rubbers include natural rubber, the general purpose synthetic rubbers, and specialty rubbers. Examples of the highly unsaturated diene rubbers are natural rubber, polyisoprenes, polybutadienes, poly(butadiene-styrene) rubbers, poly(isoprene-styrene) rubbers, polychloroprenes, poly(butadiene-acrylonitrile) rubbers, poly(isoprene-acrylonitrile) rubbers, polypentenamer rubbers, and the like.

Other useful sulfur vulcanizable polymers containing from about 0.1 to about 20% by weight of olefinic unsaturation are readily employed. Examples of such are isoprene-isobutylene (Butyl) rubbers; ethylene-propylene-diene polymers (EPDM) containing from about 0.5 to about 20% by weight of a diene monomer where the diene is conjugated as in butadiene, 1,3-pentadiene, and the like; non-conjugated as in 1,4-pentadiene, 1,4-hexadiene, and the like; cyclic dienes as in cyclopentadiene, dicyclopentadiene, and the like; an alkenyl norbornene such as 5-ethylidene-2-norbornene, 2-isopropenyl-5-norbornene, and the like; and others such as 3-ethylbicyclonondiene and 3-methyltricyclo-(5,2,1,0$^{2,6}$)-3,8-decadiene; and polyether terpolymers containing about 0.5% to about 20% by weight of allyl glycidyl ether or glycidyl acrylate or methacrylate.

The cycloalkylthioaniline retarders can be used with a full range of compounding ingredients. This includes activators such as metal oxides like zinc and magnesium oxide, lead monoxide, fatty acids such as stearic and lauric acid, and salts thereof such as cadmium, zinc and copper stearate and lead oleate; fillers such as the carbon blacks, calcium and magnesium carbonates, calcium and barium sulfates, aluminum silicates, phenol-formaldehyde and polystyrene resins, asbestos, and the like; plasticizers and extenders such as dialkyl and diaryl organic acids like diisooctyl, and dibenzyl oleates, stearates, and phthalates, ASTM type 2 petroleum oils, ASTM D2226 aromatic, naphthalenic and paraffinic oils, and the like; antioxidants, antiozonants, and stabilizers such as di-β-naphthyl-p-phenylenediamine, phenyl-β-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2,2'-methylenebis-(4-ethyl-6-t-butyl phenol), 2,2'-thiobis-(4-methyl-6-t-butyl phenol), bisphenol-2,2'-methylenebis-6-t-butyl-4-ethylphenol, 4,4'-butylidenebis-(6-t-butyl-m-cresol), 2-(4-hydroxy-3,5-t-butylaniline)-4,6-bis(octylthio)-1,4,5-triazine, hexahydro-1,3,5-tris-β-(3,5-di-t-butyl-4-hydroxyphenyl)propionyl-s-triazine, tris-(3,5-di-t-butyl-4-hydroxybenzyl)isocyanurate, tetrakismethylene-3-(3',5'-di-t-butyl-4-hydroxyphenyl)propionate methane, distearyl thiodipropionate, dilauryl thiodipropionate, tri(nonylatedphenyl)phosphite, and the like; and other ingredients such as pigments, tackifiers, flame retardants, fungicides, and the like.

The vulcanization retarders, accelerators, sulfur, and other compounding ingredients are admixed with the polymer using conventional equipment such as two-roll mills and internal mixing equipment such as banburys, extruders, and Brabender mixers. Standard mixing and addition techniques are employed.

The effectiveness of the retarders can be measured as the increase in scorch time that the compound produces in the stock. Scorch time can be determined by various methods. A standard method is ASTM Procedure D 1646 wherein, using a Mooney Viscometer with a large rotor, a T$_5$ value is determined. This value is the time in minutes for a compounded polymer stock heated at a set temperature to reach a minimum viscosity value and then to rise 5 units over this value. Scorch time can also be determined by using a Monsanto Rheometer and measuring T$_2$, the time in minutes for a stock to advance 2 chart units over minimum. Another method is to use the B.F.G. Cone Curometer described in U.S. Pat. No. 3,494,172. The stock is placed in a conical cavity and then a ram brought down and oscillated. The resistance to the ram's movement exerted by the stock is displayed as torque versus time (at a set temperature). The time measured is T$_s$, 2 or T$_s$, 3, which is the time in minutes for the torque to rise 2 (or 3) inch-pounds over the minimum torque value. A longer time of T$_s$, 2 indicates increased scorch safety.

Once the stock starts to cure, cure rates using the cycloalkylthioaniline retarders are about as fast as those obtained without using the retarders. The stocks are cured at a temperature range from about 250°F. to about 450°F. The temperature chosen is usually determined by the type of polymer used and the mixing equipment employed.

The cycloalkylthioanilines have many practical uses. Their use allows the use of fast-curing accelerators in standard or ordinary processing procedures where otherwise the accelerators would be too scorchy. By delaying the onset of cure, higher processing temperatures may be employed, thereby increasing product output. Stocks which are marginally scorchy can be made less scorchy resulting in less waste. Also, storage capacity of stocks can be greatly improved with the addition of the compounds. Further advantages will become apparent to those skilled in the art.

The following examples are set forth to illustrate specific embodiments of the invention. Ingredients used are given in parts by weight unless otherwise indicated.

Tensile, modulus, and elongation were measured following ASTM D 412.

EXAMPLE I

Preparation of Cyclohexanesulfenyl chloride 116.2 grams of cyclohexylmercaptan was placed in a reactor vessel with 750 milliliters of heptane. The solution was stirred and cooled to −5°C. to −10°C. Chlorine gas was then bubbled through the solution for 129 minutes at a rate of 35.0 grams per hour (70 grams total of $Cl_2$). Then nitrogen gas was bubbled through the solution until no hydrogen chloride was detected in the exit gas (about 4 hours). The solution was stored at 0°C. for future use.

Preparation of N-cyclohexylthio-2,4-dinitroaniline

Procedure A 2,4-dinitroaniline, 45.8 grams, was placed in a reactor vessel with 450 milliliters of dimethylformamide and 75 grams of triethylamine as a catalyst. 385 milliliters of the above solution of cyclohexanesulfenyl chloride in heptane was then added at a rate of about 7 milliliters per minute. Temperature at the start of the addition was 23°C. and at the end 34°C. After the addition, about 1 hour, the mixture was stirred overnight (about 16 hours) at room temperature. The mixture was then filtered to remove a water-soluble precipitate. The filtrate was separated and the dimethylformamide phase was poured into ice water. A brown solid formed which was filtered out. The solid was mixed with trichloromethane and water. A solid forming at the interface of the phases was filtered out. The trichloromethane phase was concentrated by evaporating off the solvent, yielding a dark yellow liquid. Hexane was added to the liquid and a yellow-brown solid formed, which was later recrystallized from hexane to yield a solid having a melting point of 86°–88°C. 6.2 grams of compound was obtained. The compound was identified through its NMR spectra as N-cyclohexylthio-2,4-dinitroaniline. The calculated carbon, nitrogen, and hydrogen weight percents were 48.3%, 14.0%, and 5.6% respectively. The values found were 48.2% carbon, 14.1% nitrogen, and 5.2% hydrogen.

Procedure B

Tetrahydrofuran, 250 milliliters, and 22.9 grams of 2,4-dinitroaniline was placed in a reactor vessel and stirred at room temperature. Nitrogen gas was then introduced to evacuate the vessel of air. 100 milliliters of a solution of 23.1% by weight n-butyl lithium in hexane (0.25 mole of n-butyl lithium) was slowly added. Temperature rose throughout the addition to 85°C. The solution was then cooled to 30°C. and a cyclohexanesulfenyl chloride solution (0.25 mole) prepared as above was added at 14 milliliters per minute. The mixture was stirred overnight. The reaction mixture was filtered to remove a water-soluble solid, and the filtrate concentrated to about 300 milliliters by evaporating off tetrahydrofuran. A dark red-brown solid precipitated out and was separated out by filtration. The solid was washed with isopropanol, which yielded a yellow solid, and then was washed with water. The yellow solid was recrystallized from hexane to yield 8.3 grams of a yellow product which was identified by its NMR spectrum to be N-cyclohexylthio-2,4-dinitroaniline.

Using the same procedures, and employing other electron-withdrawing group substituted anilines for the 2,4-dinitroaniline employed above, yields many other cycloalkylthio-(electron-withdrawing group substituted) aniline compounds which are useful as vulcanization retarders. Procedure B, using the organo-lithium catalyst, works better to prepare cycloalkylthioaniline compounds substituted with halogen groups, especially with chlorine groups.

EXAMPLE II

The N-cyclohexylthio-2,4-dinitroaniline prepared in Example I was evaluated as a vulcanization retarder in a cure of SBR rubber. The SBR rubber has a composition of 23.5% by weight of styrene and 76.5% by weight of butadiene and a Mooney value (ML-4 at 212°F.) of about 50. The recipe used and data obtained is as follows:

|  | 1 | 2 |
| --- | --- | --- |
| SBR | 100 | 100 |
| HAF black | 50 | 50 |
| Stearic acid | 3 | 3 |
| Zinc oxide | 5 | 5 |
| BBTS[1] | 1 | 1 |
| Sulfur | 2 | 2 |
| CHTA[2] | — | 0.5 |
| Monsanto rheometer at 284°F. |  |  |
| $T_2$, minutes | 15.2 | 20.6 |
| Δtorque, inch-pounds | 75.0 | 73.5 |
| Cured at 320°F. |  |  |
| cure time, minutes | 14 | 19 |
| 300% modulus, psi | 2250 | 2520 |
| Tensile, psi | 2650 | 3450 |
| Elongation, percent | 350 | 370 |

[1]N-t-butyl-2-benzothiazolesulfenamide
[2]N-cyclohexylthio-2,4-dinitroaniline

The samples show that the N-cyclohexylthio-2,4-dinitroaniline effectively delayaed the onset of cure in the SBR polymer. The cured properties of Sample 2 are even better than those of Sample 1 which contained no aniline compound.

EXAMPLE III the N-cyclohexylthio-2,4-dinitroaniline compound was also evaluated as a vulcanization retarder in the cure of a poly(butadiene-acrylonitrile) rubber, an NBR rubber. The NBR has an acrylonitrile content of 33% by weight and a butadiene content of 67%, and a Mooney value of 80 (ML-4at 212°F.). The recipes used and the data obtained are as follows:

|  | 1 | 2 |
| --- | --- | --- |
| NBR | 100 | 100 |
| FEF black | 40 | 40 |
| Stearic acid | 1 | 1 |
| Zinc oxide | 5 | 5 |
| PBNA[1] | 1 | 1 |
| MBTS[2] | 1 | 1 |
| Sulfur | 1.5 | 1.5 |
| CHTA[3] | — | 0.5 |
| Monsanto rheometer at 284°F. |  |  |
| $T_2$, minutes | 8.2 | 11.0 |
| Δtorque, inch-pounds | 82 | 73 |
| Cured at 302°F. |  |  |
| cure time, minutes | 17 | 21 |
| 300% modulus, psi | 2070 | 1890 |
| Tensile, psi | 3130 | 3240 |
| Elongation, percent | 440 | 470 |

[1]N-phenyl-β-naphthylamine
[2]2,2'-dibenzothiazyl disulfide
[3]N-cyclohexylthio-2,4-dinitroaniline The N-cyclohexylthio-2,4-dinitiroaniline effectively delayed the onset of cure of the NBR polymer. Sample 2, containing the aniline compound, has physical properties as good as or better than Sample 1.

EXAMPLE IV

Natural rubber cures very fast in the presence of benzothiazole accelerators. N-cyclohexylthio-2,4-dinitroaniline was evaluated as a vulcanization retarder in pale crepe Natural Rubber. The recipe employed was: 100 parts by weight Natural rubber, 50 parts HAF carbon black, 3 parts stearic acid, 5 parts zinc oxide, 1 part (OBTS) N-oxydiethylene benzothiazole-2-sulfenamide, and 2.5 parts by weight of sulfur. The composition had a scorch time, $T_2$, of 8.9 minutes using a Monsanto rheometer at 284°F. When 1.0 part by weight of N-cyclohexylthio-2,4-dinitroaniline was added to the above recipe, the $T_2$ scorch time was 21.7 minutes, indicating a 144% increase in scorch safety. A commercial vulcanization retarder, Santogard PVI (N-cyclohexylthiophthalimide), was also evaluated at 1.0 part by weight. The PVI yielded comparable scorch safety, but three months after cure the stock showed medium to heavy bloom on the surface. In contrast, the stock containing the aniline compound showed only slight bloom after 3 months.

EXAMPLE V

A cycloalkylthio (electron-withdrawing group substituted) aniline compound of the present invention was compared with a similar compound disclosed in the art. In U.S. Pat. 3,513,139, column 8, lines 20 to 26, the compound N-(phenylthio)aniline showed a 72% increase in scorch delay when used at 1.0 part by weight in a Natural rubber recipe. The example was repeated except for the use of 1.0 part by weight of N-cyclohexylthio-2,4-dinitroaniline in place of the N-phenylthioaniline. The recipe used was: 100 parts by weight natural rubber, 50 parts HAF carbon black, 5 parts zinc oxide, 3 parts stearic acid, 10 parts softener, 3.0 parts Santoflex 77 (N,N'-bis(1,4-dimethylphenyl)-p-phenylenediamine), 0.5 part Santocure MOR (2-morpholinothiobenzothiazole), 0.5 part of sulfur, and 1.0 part by weight of N-cyclohexylthio-2,4-dinitiroaniline. The composition was then evaluated for its scorch time at various times and temperatures. The conditions and data obtained are as follows:

| | Without compound | With compound | Percent increase |
|---|---|---|---|
| Mooney scorch at 250°F. $T_5$, minutes | 21.0 | 59.0 | 181 |
| Mooney scorch at 275°F. $T_5$, minutes | 8.9 | 22.7 | 155 |
| Monsanto rheometer at 291°F. $T_2$, minutes | 4.0 | 9.4 | 135 |

In all three instances, the percent increase in scorch safety was about 2 to 2.5 times as great as the scorch safety obtained using the known N-phenylthioaniline compound.

I claim:

1. Cycloalkylthio aniline compounds of the formula

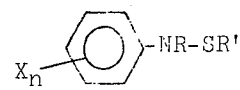

wherein X is $-NO_2$, $n$ is an integer from 2 to 4, R is selected from the group consisting of hydrogen, an alkyl radical containing 1 to 8 carbon atoms, a phenyl radical, and $-SR'$; and R' is a cycloalkyl radical containing 4 to 8 carbon atoms in the ring.

2. A compound of claim 1 wherein R' is a cycloalkyl radical containing 5 to 7 carbon atoms, and $n = 2$.

3. A compound of claim 2 wherein R is hydrogen.

4. The compound of claim 3, N-cyclohexylthio-2,4-dinitroaniline.

* * * * *